United States Patent [19]
Gifford

[11] Patent Number: 5,198,050
[45] Date of Patent: Mar. 30, 1993

[54] COMPOSITE COMBINATION BEAD AND BEAD FILLER

[75] Inventor: James H. Gifford, Orange, Conn.

[73] Assignee: Pirelli Armstrong Tire Corporation, New Haven, Conn.

[21] Appl. No.: 339,647

[22] Filed: Apr. 18, 1989

[51] Int. Cl.⁵ .................. B60C 15/04; B60C 15/06; B60C 17/00

[52] U.S. Cl. ................... 152/517; 152/539; 152/540; 152/541; 152/547; 152/555

[58] Field of Search ............... 152/516, 577, 539, 541, 152/540, 547, 555; 156/136; 245/1.5

[56] References Cited

U.S. PATENT DOCUMENTS

| | | |
|---|---|---|
| 1,435,667 | 11/1922 | Schultz . |
| 1,513,434 | 10/1924 | Sloper ........................ 152/540 |
| 1,578,202 | 3/1926 | Midgley . |
| 1,749,899 | 3/1930 | Alderfer ...................... 156/136 |
| 1,809,106 | 6/1931 | Carlin ......................... 152/541 |
| 2,757,701 | 8/1956 | Henson ........................ 152/540 |
| 3,044,523 | 7/1962 | Drakeford et al. ............ 152/541 |
| 3,612,139 | 10/1971 | Marsocchi et al. ............ 152/540 |
| 3,658,108 | 4/1972 | Marzocchi et al. . |
| 3,916,968 | 11/1975 | Masson ........................ 152/555 |
| 3,935,894 | 2/1976 | Pouilloux ..................... 152/540 |
| 3,945,420 | 3/1976 | Goerter et al. . |
| 3,994,329 | 11/1976 | Masson et al. ................ 152/555 |
| 4,098,316 | 7/1978 | Carvalho et al. . |
| 4,111,249 | 9/1978 | Markow . |
| 4,168,193 | 9/1979 | Brunet et al. ................ 152/540 |
| 4,202,717 | 5/1980 | Seiberling .................... 152/540 |
| 4,236,563 | 12/1980 | Moers et al. .................. 152/541 |
| 4,320,791 | 3/1982 | Fujii et al. ................... 152/540 |
| 4,428,411 | 1/1984 | Markow et al. . |
| 4,459,167 | 7/1984 | Markow et al. . |
| 4,627,479 | 12/1986 | Shurman et al. . |
| 4,630,663 | 12/1986 | Bell et al. . |
| 4,644,988 | 2/1987 | Ahmad et al. . |
| 4,673,014 | 6/1987 | Markow . |
| 4,711,285 | 12/1987 | Ogawa et al. ................ 152/541 |
| 4,766,940 | 8/1988 | Yokoyama et al. ............ 152/547 |
| 4,776,909 | 10/1988 | Bohm et al. . |
| 4,800,120 | 1/1989 | Jadamus et al. . |
| 4,809,758 | 3/1989 | Janus . |

FOREIGN PATENT DOCUMENTS

| | | |
|---|---|---|
| 0173670 | 5/1986 | European Pat. Off. . |
| 0238679 | 9/1987 | European Pat. Off. ......... 152/542 |
| 8904250 | 5/1989 | PCT Int'l Appl. ............. 245/1.5 |

OTHER PUBLICATIONS

Mechanics of Pneumatic Tires, U.S. D.O.T., pp. 209-214 (1981).

Primary Examiner—Michael W. Ball
Assistant Examiner—Nancy T. Krawczyk
Attorney, Agent, or Firm—St. Onge, Steward, Johnston & Reens

[57] ABSTRACT

A pneumatic tire having an annular band is provided, the annular band for reinforcing a bead portion and a sidewall portion of the pneumatic tire. In one embodiment, the annular band comprises a plurality of filaments having a high extensional modulus of elasticity and a high tenacity bonded together in a matrix of resin. Further, the annular band is cured or formed with a cross-section which tapers from the tire's bead portion to the tire's sidewall portion. Preferably, the annular band may be cured or formed in situ during the curing of the tire in which it is placed. In another embodiment, a structural element having a high resistance to compression is bonded to and circumferentially within the annular band. In a third embodiment the structural element is wedge-shaped in cross-section.

32 Claims, 2 Drawing Sheets

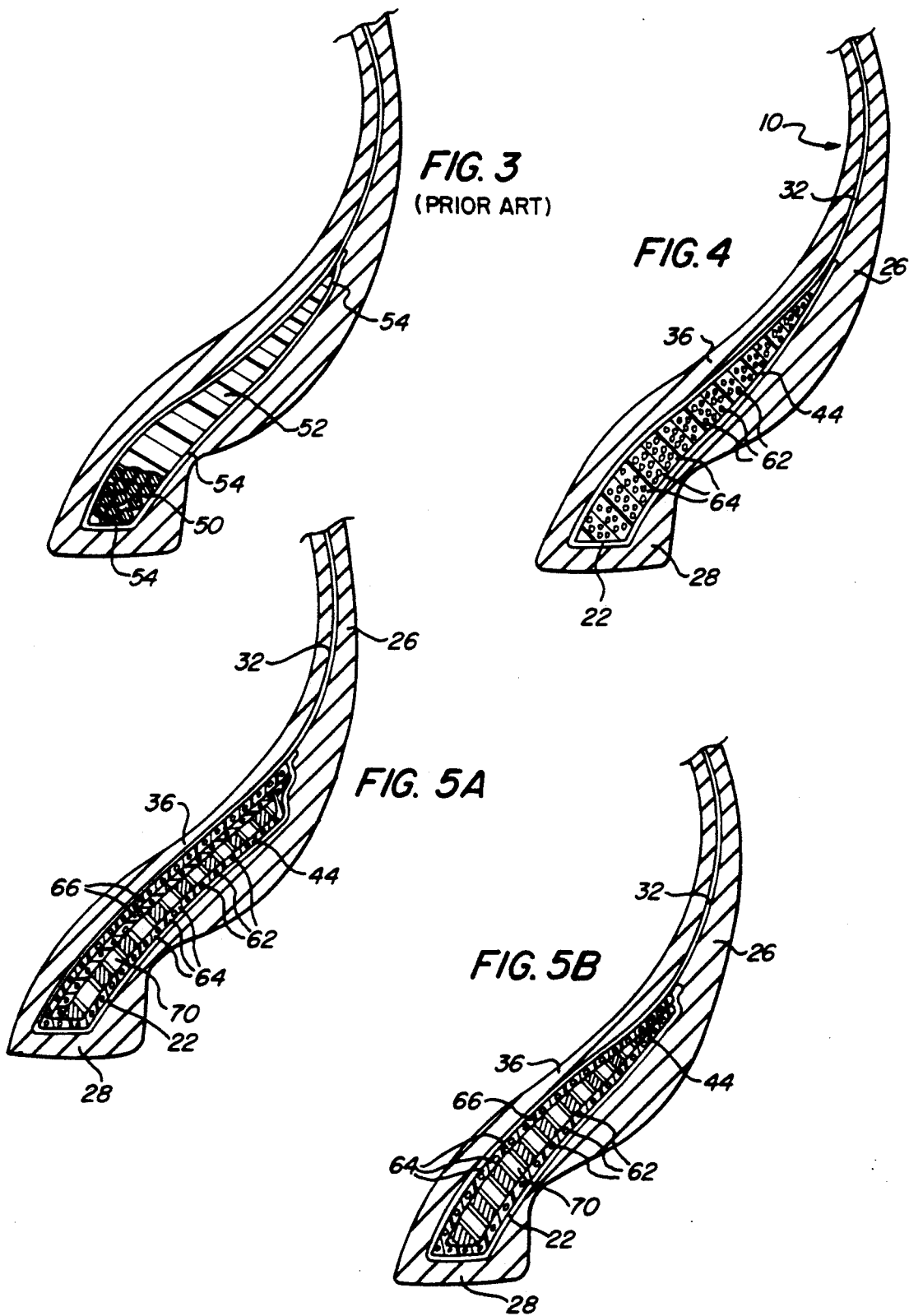

COMPOSITE COMBINATION BEAD AND BEAD FILLER

TECHNICAL FIELD

This invention relates to pneumatic tires and, more specifically, to pneumatic tires having an annular band for reinforcing the bead and lower sidewall portions of the pneumatic tires.

BACKGROUND ART

Beads for reinforcing a bead portion of a pneumatic tire are well known and widely used in the art. Many examples of bead construction are provided, for example, in *Mechanics of Pneumatic Tires*, U.S. D.O.T., pp. 209–214 (1981). The most prevalent prior art bead comprises a steel cable made of a plurality of drawn steel wires. This construction permits a combination of some flexibility and high tensile strength. One drawback of steel beads is their relatively high mass, as compared with the same volume of tire rubber, which substantially reduces a tire's fuel efficiency. Further, it is common for prior art tire constructions of the type including a steel bead or equivalent to also have a bead filler. Bead filler, or wedges, or packing serves to provide additional stability to sidewalls and to provide a suitable return angle to carcass plies which may turn up around the beads and return back toward the sidewall. *Mechanics*, pp. 209–214.

U.S. Pat. No. 3,612,139 to Marzocchi et al. discloses a wheel-rim-engaging bead structure comprising a bead ring having glass filaments in particular geometric dispositions and an elastomeric matrix.

U.S. Pat. No. 4,098,316 to Carvalho et al. discloses a bead ring having glass filaments and at least one metal filament in an elastomeric matrix.

U.S. Pat. No. 4,320,791 to Fujii et al. discloses a slender bead element made of nonmetallic fiber and a matrix of liquid thermosetting resin or liquid rubber.

U.S. Pat. No. 4,711,285 to Ogawa et al. discloses a short fiber reinforced rubber bead filler designed to maximize both controllability and ride comfort.

None of the above prior art discloses a tire construction having a composite combination bead and bead filler for reinforcing a bead portion and a lower sidewall portion of a pneumatic tire.

SUMMARY OF THE INVENTION

This invention relates to a pneumatic tire having an annular band for reinforcing a bead portion and a sidewall portion of the pneumatic tire. In one embodiment, the annular band comprises a plurality of filaments having a high extensional modulus of elasticity and a high tenacity bonded together in a matrix of resin. The lightweight band provides reinforcement which improves the fuel economy, handling efficiency, uniformity and run-flat capability of the tire. Further, the annular band is cured or formed with a cross-section which tapers from the tire's bead portion to the tire's sidewall portion. Material for the filaments is preferably taken from the group consisting of steel, fiberglass, carbon, polyesters, and most preferably aramid.

The resin is preferably taken from the group consisting of epoxies, polyesters, nylons, and most preferably polyphenylene ethers. Preferably, the annular band may be cured or formed in situ during the curing of the tire in which it is placed to improve the uniformity and homogeneity of the tire construction. The annular band could also be molded or preformed as a separate and final component which is then built into the tire and bonded to the surrounding components during the curing of the tire in its mold.

In another embodiment, a structural element having a high resistance to compression is bonded to and circumferentially within the annular band to provide additional rigidity while still further reducing weight. The structural element is preferably taken from the group consisting of corrugations, rigid foams, and most preferably honeycombs. In a third embodiment, the structural element is wedge-shaped in cross-section.

It is an object of this invention to provide a lightweight annular band for reinforcing a bead portion and a lower sidewall portion of a pneumatic tire. It is another object of this invention to provide a tire having improved run-flat capability and handling characteristics. It is still another object of this invention to provide a move uniform and homogeneous tire construction to increase a tire's useful life. These and other objects of the invention will become more apparent from the following detailed description when considered with reference to the accompanying drawings.

BRIEF DESCRIPTION OF THE DRAWINGS

FIG. 3 is an enlarged partial cross-sectional view of a bead portion and sidewall portion of the right side of a prior art tire.

FIG. 4 is an enlargement of the right side of FIG. 2 depicting the construction of one embodiment of the annular band.

FIG. 5A is a view of another embodiment of the annular band in FIG. 4 including one embodiment of a structural element which is bonded to and circumferentially within the annular band.

FIG. 5B is a view of a third embodiment of the annular band in FIG. 4 including another embodiment of the structural element of FIG. 5A which is bonded to and circumferentially within the annular band.

DETAILED DESCRIPTION

Figure 1:
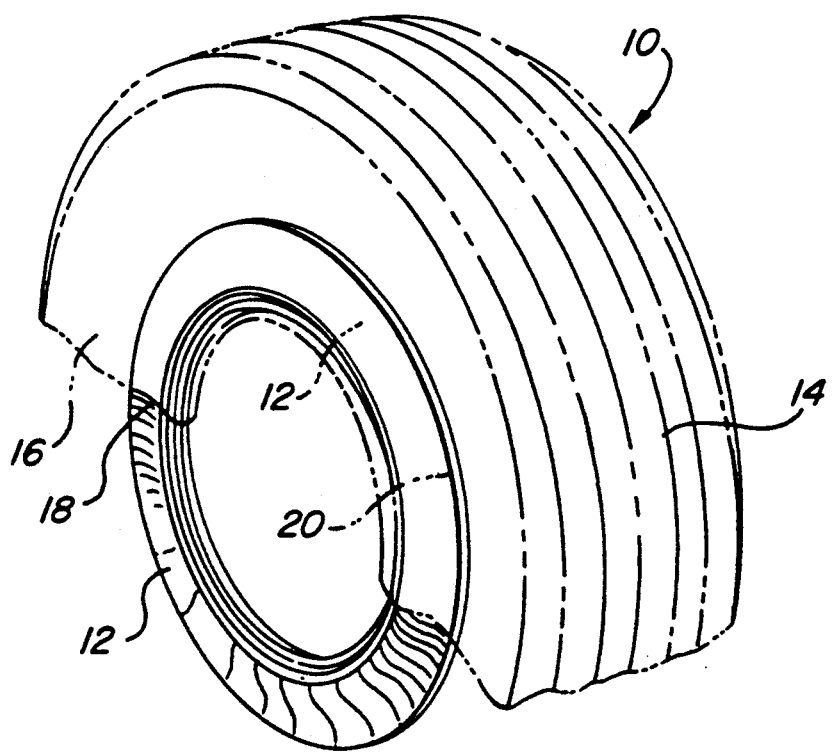
FIG. 1 is a front perspective view of a tire, partially cut away to reveal an annular band, in accordance with this invention, reinforcing a bead portion and a sidewall portion thereof.

FIG. 1 is a front perspective view of a tire 10, partially cut away to reveal an annular band 12, in accordance with this invention. Tire 10 includes a tread portion 14, a sidewall portion 16, and a bead portion 18. In addition, tire 10 has another annular band 22, another sidewall portion 26, and another bead portion 28 on the other side thereof which are not visible in this view.

Figure 2:
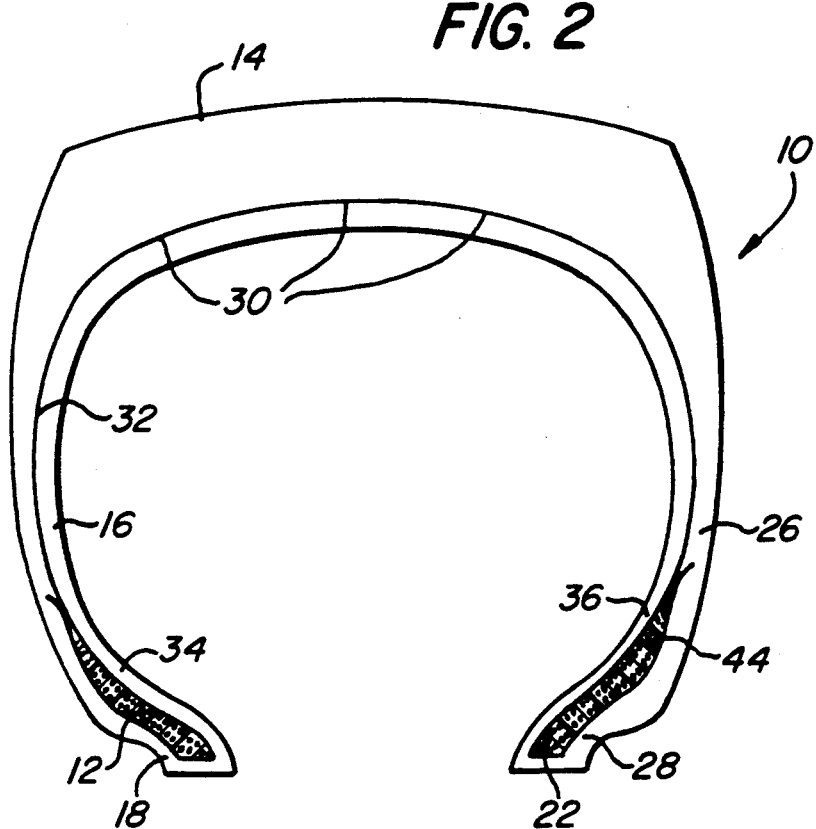
FIG. 2 is a front cross-sectional view of the tire in FIG. 1 depicting the placement of the annular band as it tapers from the bead portion to the sidewall portion of the tire.

Annular band 12 is inserted into the tire as shown in dashed lines, indicated at 20, to reinforce bead portion 18 and sidewall portion 16. Referring now to FIG. 2, a front cross-sectional view of tire 10 further depicts the placement of annular bands 12 and 22 within respective bead portions 18 and 28 and respective sidewalls 16 and 26. Prior art tire sidewalls are typically made from rubber or other polymeric material reinforced only by carcass layers. Under conditions of less than optimal inflation, the sidewalls of a typical prior art tire tend to buckle degrading the handling characteristics and if sufficiently deflated the run-flat capability of the tire.

Annular bands 12 and 22 help alleviate the collapse of under-inflated tire sidewalls by reinforcing respective lower portions 34 and 36 of sidewalls 16 and 26 with respective tapered portions 42 and 44.

In this regard, annular bands 12 and 22 are each generally between about 1 inch and about 3 inches long, and extend generally between about ¼ to about ⅓ of the way up into respective sidewalls 16 and 26.

Referring now to FIG. 3, an enlarged partial cross-sectional view of a prior art tire depicts a typical prior art bead 50 and typical prior art bead filler 52. The prior art teaches a wide variety of beads and bead constructions, but prior art bead 50 is most typically a steel cable made of a plurality of drawn steel wires. *Mechanics*, pp. 209–214. However, prior art bead 50 is disadvantageously heavy, reducing the fuel efficiency of prior art tires. Further, steel cables require significant modification prior to being incorporated in a finished tire. Bead filler 52 as described in the prior art primarily serves two functions. First, it provides a suitable return angle to carcass plies which may turn-up, as indicated at 54, around the beads and return back toward the side wall. *Mechanics*, pp. 209–214. Second, it improves controllability of the tire by stiffening the lower side wall. U.S. Pat. No. 4,711,285. However, prior art bead filler 52 generally is neither stiff nor light enough to appreciably improve a prior art tire's run-flat capability, fuel efficiency, or handling characteristics.

Referring now to FIG. 4, a partial enlargement of the right side of tire 10 as shown in FIG. 2, details the shape and construction of annular band 22. It should be understood that annular band 12 (shown in FIG. 2 only) is substantially the same as annular band 22, except that annular band 12 fits in the left side of tire 10. In this regard, the detailed description of annular band 22 applies equally to annular band 12 though it is not shown in an enlarged view for sake of simplicity. Annular band 22 narrows or tapers from generally less than about 1 inch wide to about 1/16 inches wide at its tapered portion 44. This taper allows annular band 22 to provide the necessarily greater reinforcement in bead portion 28 of tire 10 and also reinforce lower portion 36 of sidewall 26 without bringing undesirable bulk to this region of tire 10. In addition to the taper, annular bands may include a slight curvature, permitting them to conform to the slope of the lower sidewall of tires.

Annular band 22 is made from reinforcing filaments 62 with a high tenacity of greater than about 12 grams/denier and a high extensional modulus of elasticity of between about $10^2$ grams/denier to about $10^3$ grams/denier in a matrix of resin 64. The taper of annular band 22 provides more filaments 62 and resin 64 to reinforce bead portion 28 as lower sidewall 36 of tire 10. Reinforcing filaments 62 are preferably taken from the group consisting of aramid, fiberglass, carbon, and polyesters. Aside from considerations of cost, however, filaments 62 are most preferably aramid, then carbon, then fiberglass, then polyesters with an extensional modulus of elasticity of between about 200 grams/denier and about 600 grams/denier. Annular band 22 may be cured or formed from thermoplastic resin such as, for example, nylons or polyphenylene ethers, or thermosetting resin such as, for example, epoxies or polyesters, but is preferably cured or formed from thermoplastic resin. The most preferred thermosetting resin is epoxy. The most preferred thermoplastic resin is polyphenylene ether such as, for example, that sold under the trademark VESTORAN ® by Huls Aktiengesellschaft, and especially VESTORAN ® 1900 and VESTORAN ® 2000. One advantage of using polyphenylene ether as the resin is that it firmly bonds to rubber compositions without the need for an additional adhesive. One such tire rubber composition includes in parts by weight: 100. SBR, 25.0 carbon black, 3.00 aromatic oil, 4.00 zinc oxide, 1.00 stearic acid, 1.50 sulfur, and 1.30 DCBS.

Referring now to FIG. 5A, annular band 22 is shown including one embodiment of a structural element 70 bonded to and circumferentially within annular band 22. Structural element 70 has a high resistance to compression of generally between about 1000 psi and about 1200 psi. Structural element 70 is also lighter in weight than resin 64, such that structural element 70 adds increased strength to annular band 22 without increasing its weight. In the illustrated embodiment, structural element 70 is generally between about ⅞ inches long and about 2½ inches long and about 1.3 mm thick and about 3.8 mm thick.

Further, structural element 70 is encased in prepreg plies 66 of resin 64 and cords 62. Referring briefly to FIG. 5B, annular band 22 is shown including another embodiment of structural element 70 bonded to and circumferentially within band 22. In this embodiment, structural element 70 is wedge-shaped and tapers from less than about 8 mm thick to greater than about 1 mm thick over a length similar to that of the first embodiment. Structural element 70 is preferably taken from the group consisting of corrugations, rigid foams, and most preferably honeycombs. Structural element 70 may, for example, be an aramid honeycomb made from a material trademarked NOMEX ® by DuPont De Nemours Inc.

The above description is not meant to describe in detail each and every modification and variation which will be apparent to a person skilled in the art.

What is claimed is:

1. A pneumatic tire having a bead and a sidewall portion, the bead and sidewall portion reinforced by an annular band, the annular band comprising:
   a plurality of filaments having a high extensional modulus of elasticity and a high tenacity bonded together in a matrix of resin;
   the filaments arranged to provide the annular band with a tapering configuration from the bead to the sidewall portion; and
   wherein the resin is taken from the group consisting of epoxies, polyesters, nylons, and polphenylene ethers and the filaments are taken from the group of aramid, fiberglass, carbon, and polyesters.

2. The pneumatic tire of claim 1 wherein the filament material is aramid and the resin is polyphenylene ether.

3. The pneumatic tire of claim 1 wherein the resin is cured or formed in situ during the curing of the tire in which the band is placed.

4. The pneumatic tire of claim 1 wherein the annular band is preformed or precured prior to incorporation into the pneumatic tire to be reinforced.

5. A pneumatic tire having a bead portion and a sidewall portion, the bead and sidewall portions reinforced by an annular band, the annular band comprising:
   a plurality of filaments having a high extensional modulus of elasticity and a high tenacity bonded together in a matrix of resin; and a structural element having a high resistance to compression bonded to and circumferentially within the annular band;

the filaments arranged to provide the annular band with a tapering configuration from the bead portion to the sidewall portion;

the resin cured or formed during the curing of the tire in which the annular band is placed; and the resin selected from the group consisting of epoxies, polyesters, nylons, and polyphenylene ether.

6. The pneumatic tire of claim 5 wherein the resin is polyphenylene ether.

7. The pneumatic tire of claim 5 wherein material for the filaments is taken from the group consisting of aramid, fiberglass, carbon, and polyesters.

8. The pneumatic tire of claim 5 wherein the filament material is aramid and the resin is polyphenylene ether.

9. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin; and a structural element having a high resistance to compression bonded to and circumferentially within the annular band, the structural element having a weight lighter than a weight of the resin it replaces to add strength to the annular band without increasing its weight;

the filaments arranged such that substantially more filaments and resin reinforce a tire's bead portion as reinforce a tire's sidewall portion providing the annular band with a tapering cross-section.

10. The pneumatic tire of claim 9 wherein the resin is polyphenylene ether.

11. The pneumatic tire of claim 9 wherein the annular band is preformed or precured prior to incorporation into the pneumatic tire to be reinforced.

12. The pneumatic tire of claim 9 wherein the structural element is taken from the group consisting of honeycombs, rigid foams, and corrugations.

13. The pneumatic tire of claim 13 wherein the structural element is honeycomb.

14. The pneumatic tire of claim 9 wherein the structural element is honeycomb and the resin is polyphenylene ether.

15. The pneumatic tire of claim 9 wherein the structural element is rigid foam.

16. The pneumatic tire of claim 9 wherein the structural element is corrugation.

17. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin; and a wedge-shaped structural element having a high resistance to compression bonded to and circumferentially within the annular band;

the filaments and the wedge-shaped structural element arranged to provide the annular band with a tapering configuration from the bead portion to the sidewall portion.

18. The pneumatic tire of claim 17 wherein the resin taken from the group consisting of epoxies, polyesters, nylons, and polyphenylene ethers.

19. The pneumatic tire of claim 17 wherein the resin polyphenylene ether.

20. The pneumatic tire of claim 17 wherein material for the filaments is taken from the group consisting of aramid, fiberglass, carbon, and polyesters.

21. The pneumatic tire of claim 17 wherein the resin cured or formed in situ during the curing of the tire in which the band is placed.

22. The pneumatic tire of claim 17 wherein the annular band is preformed or precured prior to incorporation into the pneumatic tire to be reinforced.

23. The pneumatic tire of claim 17 wherein the structural element is taken from the group consisting of honeycombs, rigid foams, and corrugations.

24. The pneumatic tire of claim 17 wherein the structural element is honeycomb.

25. The pneumatic tire or claim 17 wherein the structural element is honeycomb and the resin is polyphenylene ether.

26. The pneumatic tire of claim 17 wherein the structural element is rigid foam.

27. The pneumatic tire of claim 17 wherein the structural element is corrugation.

28. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin;

the filament material taken from the group consisting of aramid, fiberglass, carbon, and polyesters;

the resin taken from the group consisting of epoxies, polyesters, nylons, and polyphenylene ethers; and a honeycomb element having a high resistance to compression bonded to and circumferentially within the annular band;

the filaments and the honeycomb element arranged to provide the annular band with a tapering configuration from the bead portion to the sidewall portion;

the resin cured or formed during the curing of the tire in which the annular band is placed.

29. The pneumatic tire of claim 28 wherein the resin is polyphenylene ether and the filament material is aramid.

30. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin; and a structural element having a high resistance to compression bonded to and circumferentially within the annular band;

the filaments arranged to provide the annular band with a tapering configuration from the bead portion to the sidewall portion;

the resin taken from the group consisting of epoxies, polyesters, nylons, and polyphenylene ethers.

31. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin; and a structural element having a high resistance to compression bonded to and circumferentially within the annular band;

the filaments arranged to provide the annular band with a tapering configuration from the bead portion to the sidewall portion;

the filaments formed of material taken from the group consisting of aramid, fiberglass, carbon, and polyesters.

32. A pneumatic tire having a bead portion and a sidewall portion, the bead and sidewall portions reinforced by an annular band, the annular band comprising:

a plurality of filaments having a high extensional modulus of elasticity and a high tenacity bonded together in a matrix of resin;

the filaments arranged to provide the annular band with a tapering configuration from the bead portion to the sidewall portion; and wherein the resin is polyphenylene ether.

* * * * *